United States Patent
Alexander et al.

(10) Patent No.: US 10,047,206 B2
(45) Date of Patent: Aug. 14, 2018

(54) METHODS OF FORMING A POLYMER LAYER ON A POLYMER SURFACE

(71) Applicant: Triblue Corporation, Lexington, KY (US)

(72) Inventors: Joseph Victor Alexander, Lexington, KY (US); Eric Anderson Grulke, Lexington, KY (US)

(73) Assignee: TRIBLUE CORPORATION, Lexington, KY (US)

( * ) Notice: Subject to any disclaimer, the term of this patent is extended or adjusted under 35 U.S.C. 154(b) by 0 days.

(21) Appl. No.: 14/979,235

(22) Filed: Dec. 22, 2015

(65) Prior Publication Data

US 2016/0185927 A1    Jun. 30, 2016

Related U.S. Application Data

(63) Continuation of application No. 14/223,583, filed on Mar. 24, 2014, now Pat. No. 9,260,539.

(Continued)

(51) Int. Cl.
*C08F 8/20* (2006.01)
*C08J 7/16* (2006.01)
(Continued)

(52) U.S. Cl.
CPC .............. *C08J 7/16* (2013.01); *B01D 53/228* (2013.01); *B01D 67/0006* (2013.01); *B01D 67/0093* (2013.01); *B01D 71/26* (2013.01); *B01D 71/34* (2013.01); *B01D 71/52* (2013.01); *C08F 8/20* (2013.01); *C08F 10/06* (2013.01);
(Continued)

(58) Field of Classification Search
None
See application file for complete search history.

(56) References Cited

U.S. PATENT DOCUMENTS

| | | |
|---|---|---|
| 5,618,887 A | 4/1997 | Bamford et al. |
| 5,763,548 A | 6/1998 | Matyjaszewski et al. |

(Continued)

FOREIGN PATENT DOCUMENTS

| | | | |
|---|---|---|---|
| WO | WO 2011/018752 | * | 2/2011 |
| WO | WO 2011018752 | | 2/2011 |

(Continued)

OTHER PUBLICATIONS

Liu, Journal of Applied Polymer Science, vol. 101, 3704-3712 (2006).*

(Continued)

*Primary Examiner* — Robert C Boyle
(74) *Attorney, Agent, or Firm* — Perkins Coie LLP

(57) ABSTRACT

Methods of forming polymer layers on polymer surfaces using surface initiated atom-transfer radical-polymerization (ATRP) are described. The method can include functionalization steps prior to performing surface initiated ATRP, such as hydroxylation steps and/or halogenation steps. The hydroxylation step can be carried out in a solution including potassium persulfate, ammonium persulfate, or lithium hydroxide. The halogenation step can also be carried out in a solution. The methods described herein can be performed on bundles of hollow polymer fibers, including bundles of hollow polymer fibers mounted in a module.

15 Claims, 7 Drawing Sheets

Related U.S. Application Data

(60) Provisional application No. 61/826,141, filed on May 22, 2013.

(51) Int. Cl.

| | | |
|---|---|---|
| *C08F 10/06* | (2006.01) | |
| *C08F 10/14* | (2006.01) | |
| *C08F 14/22* | (2006.01) | |
| *B01D 67/00* | (2006.01) | |
| *C08J 7/12* | (2006.01) | |
| *B01D 53/22* | (2006.01) | |
| *B01D 71/26* | (2006.01) | |
| *B01D 71/34* | (2006.01) | |
| *B01D 71/52* | (2006.01) | |
| *H01M 2/16* | (2006.01) | |
| *H01M 10/0525* | (2010.01) | |

(52) U.S. Cl.
CPC .............. *C08F 10/14* (2013.01); *C08F 14/22* (2013.01); *C08J 7/126* (2013.01); *C08F 2438/01* (2013.01); *C08J 2323/32* (2013.01); *C08J 2327/24* (2013.01); *C08J 2433/14* (2013.01); *H01M 2/1666* (2013.01); *H01M 10/0525* (2013.01)

(56) References Cited

U.S. PATENT DOCUMENTS

| | | |
|---|---|---|
| 5,789,487 A | 8/1998 | Matyjaszewski et al. |
| 6,111,022 A | 8/2000 | Matyjaszewski et al. |
| 6,124,411 A | 9/2000 | Matyjaszewski et al. |
| 6,162,882 A | 12/2000 | Matyjaszewski et al. |
| 6,407,187 B1 | 6/2002 | Matyjaszewski et al. |
| 6,512,060 B1 | 1/2003 | Matyjaszewski et al. |
| 6,538,091 B1 | 3/2003 | Matyjaszewski et al. |
| 6,541,580 B1 | 4/2003 | Matyjaszewski et al. |
| 6,624,262 B2 | 9/2003 | Matyjaszewski et al. |
| 6,624,263 B2 | 9/2003 | Matyjaszewski et al. |
| 6,627,314 B2 | 9/2003 | Matyjaszewski et al. |
| 6,653,415 B1 | 11/2003 | Bottcher et al. |
| 6,759,491 B2 | 7/2004 | Matyjaszewski et al. |
| 6,790,919 B2 | 9/2004 | Matyjaszewski et al. |
| 6,887,962 B2 | 5/2005 | Matyjaszewski et al. |
| 7,019,082 B2 | 3/2006 | Matyjaszewski et al. |
| 7,049,373 B2 | 5/2006 | Matyjaszewski et al. |
| 7,056,455 B2 | 6/2006 | Matyjaszewski et al. |
| 7,064,166 B2 | 6/2006 | Matyjaszewski et al. |
| 7,125,938 B2 | 10/2006 | Matyjaszewski et al. |
| 7,157,530 B2 | 1/2007 | Matyjaszewski et al. |
| 7,247,387 B1 | 7/2007 | Huang |
| 7,303,821 B1 | 12/2007 | Huang |
| 7,332,550 B2 | 2/2008 | Matyjaszewski et al. |
| 7,452,572 B1 | 11/2008 | Bocian et al. |
| 7,893,173 B2 | 2/2011 | Matyjaszewski et al. |
| 7,893,174 B2 | 2/2011 | Matyjaszewski et al. |
| 7,918,349 B2 | 4/2011 | Mickols et al. |
| 8,062,751 B2 | 11/2011 | Chang et al. |
| 8,394,022 B2 | 3/2013 | Klok et al. |
| 2004/0156912 A1 | 8/2004 | Kawamura |
| 2004/0191538 A1 | 9/2004 | Huang |
| 2006/0009550 A1 | 1/2006 | Messersmith et al. |
| 2007/0072220 A1 | 3/2007 | Chilkoti |
| 2009/0127212 A1* | 5/2009 | Muller ............... B01D 61/145 210/798 |
| 2011/0189469 A1 | 8/2011 | Stenzel et al. |
| 2011/0240550 A1 | 10/2011 | Moore et al. |
| 2011/0244443 A1 | 10/2011 | van Rijn et al. |
| 2012/0048799 A1 | 3/2012 | Na et al. |
| 2012/0150006 A1 | 6/2012 | Lavanant et al. |
| 2012/0184029 A1 | 7/2012 | Atanasova et al. |

FOREIGN PATENT DOCUMENTS

| | | |
|---|---|---|
| WO | WO 2012091965 | 7/2012 |
| WO | WO 2013011314 | 1/2013 |

OTHER PUBLICATIONS

Yao, Journal of Membrane Science, 319, (2008) 149-157.*
Xiao, Macromolecules 2002, 35, 2919-2925.*
International Search Report and Written Opinion issued for PCT/US2014/031605, dated Aug. 19, 2014. 10 pages.
Yao, Journal of Membrane Science, 319 (2008) 149-157.
Ahn et al. "Synthesis and gas permeation properties of amphiphilic graft copolymer membrances," Journal of Membrance Scoeicne, Elsevier BV, NL, vol. 345, No. 1-2, Dec. 1, 2009, pp. 128-133.
Bamford et al. "Polymer Surface Functionalisation and Grafting by a Simple and Inexpensive Method," Macromolecular Rapid Communications, vol. 15, No. 4, Apr. 1, 1994, pp. 379-384.
Bicak et al. "Graft Copolymerization of Butyl Acrylate and 2-Ethyl Hexyl Acrylate from Labile Chlorines of Poly(vinyl chloride) by Atom Transfer Radical Polymerization," Journal of Polymer Science Part A: Polymer Chemistry, John Wiley & Sons, Inc., US, vol. 41, Jan. 1, 2003, pp. 3457-3462.
Chang et al. "Surface grafting control of PEGylated poly(vinylidene fluoride) antifouling membrane via surface-initiated radical graft copolymerization," Journal of Membrane Science, Elsevier BV, NL, vol. 345 No. 1-2, Dec. 1, 2009, pp. 160-169.
Extended European Search Report issued by the European Patent Office for European Patent Application No. 14801203.2, dated Dec. 23, 2016 (8 pages).

* cited by examiner

METHODS OF FORMING A POLYMER LAYER ON A POLYMER SURFACE

CROSS-REFERENCE TO RELATED APPLICATION(S)

This application is a continuation application of U.S. patent application Ser. No. 14/223,583 filed Mar. 24, 2014, which claims priority to U.S. Provisional Application No. 61/826,141, filed May 22, 2013, the entirety of which is hereby incorporated by reference.

BACKGROUND

Membranes are widely used in a variety of applications to separate and purify liquid and gas streams. The most widely used material for the separation layer of membranes are polymers. Many polymeric materials have desirable membrane properties. However, many of these polymer materials can only be used by forming the polymer material on a support material. Exemplary support materials include polymers, plastics, metals, ceramics, and organic material. The support material may be porous or non-porous. The support material is generally required because the separation layer is thin and delicate.

Various methods have been used to form thin separation layers on support material. Traditional approaches involve solution-deposition, plasma polymerization, interfacial polymerization, and doctor blade approaches on flat sheets. These techniques may have various drawbacks, such as limited choice of applicable materials, high expense, and lack of coating durability.

Another method that has been used to form thin polymer separation layers on the surface of support materials is surface initiated radical polymerization. However, various issues arise with such techniques. For example, a free radical polymerization process initiated from a surface is generally not controllable. As a result, the polymer layer formed by this method may be too thick to function and/or may lack uniform thickness.

Controlled radical polymerizations initiated from a surface have meet with greater success. The slow and controlled nature of these reactions allows for uniform coatings to be formed. Unfortunately, previously available techniques of controlled radical polymerization involve the use of harsh conditions and/or environments that were not economically viable to scale.

Atom-transfer radical-polymerization, such as disclosed in U.S. Pat. Nos. 5,763,548 and 5,789,487, allows for controlled radical polymerization reactions to be performed using inexpensive reagents in mild conditions. Varieties of ATRP may be performed at room temperature and pressure with aqueous solvents.

The process of carrying out surface initiated atom-transfer radical-polymerization generally requires one or more preparation steps in which the surface on which a layer of material is formed is functionalized. Functionalization steps can include hydroxylating the surface and halogenating the surface. Various drawbacks associated with these functionalization steps have contributed to surface initiated atom transfer radical-polymerization not being usable on a commercial scale.

In the traditional hydroxylation step, gases such as ozone have been used to add —OH groups to the surface of a material. The use of ozone complicates the overall process because it can rapidly degrade the mechanical properties of the polymers upon exposure.

In the traditional halogenation step, acyl halides such as bromoisobutyryl bromide has been used. The use of such acyl halides poses difficulties due to the air and water sensitivity of these reagents (i.e., they environment must be kept air and water free). As a result, scale up of the halogenation process is difficult or impossible.

The problems identified above with functionalization have also posed problems with respect to scale up. To date, no methods of surface-initiated atom-transfer radical polymerization has been developed which can be used to add polymer coatings to surfaces at high volumes and with relatively low costs.

BRIEF DESCRIPTION OF THE DRAWINGS

Non-limiting and non-exhaustive embodiments of the methods and systems disclosed herein are described with reference to the following figures, wherein like reference numeral refer to like parts throughout the various views unless otherwise specified.

DETAILED DESCRIPTION

Overview

Figure 1:
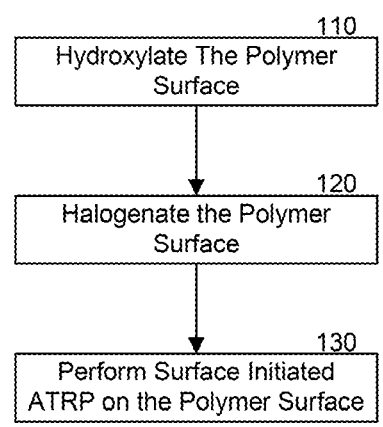
FIG. 1 is a flow chart illustrating a method of forming a polymer layer on a polymer surface according to various embodiments described herein.

The instant disclosure is directed to various methods of forming thin non-porous polymer layers on porous or non-porous polymer surfaces, wherein the polymer layers are formed using surface initiated atom-transfer radical polymerization. In some embodiments, the methods are related to performing these methods on bundles of hollow polymer fibers in an effort to produce materials well suited for various separation applications. The method can include the use of various solutions formulated to carry out functionalization steps and/or atom-transfer radical polymerization steps. In some embodiments, the functionalization steps can include the hydroxylation and halogenation of the polymer surface. These functionalization steps prepare the polymer surface for atom-transfer radical polymerization. The various methods described herein can also be performed in uniquely designed modules. The modules allow the polymer surface to be mounted within a closed vessel. Once mounted, various solutions can be passed into and out of the module in order to carry out the methods described herein. In some embodiments, the modules are configured in a shell-and-tube type configuration, which allows for selective exposure of the polymer surfaces to the solutions passed through the module (e.g., only an exterior or interior surface is exposed to the solution).

References throughout this specification to "one example," "an example," "one embodiment" or "an embodiment" mean that a particular feature, structure, process or characteristic described in connection with the example is included in at least one example of the present technology. Thus, the occurrences of the phrases "in one example," "in an example," "one embodiment" or "an embodiment" in various places throughout this specification are not necessarily all referring to the same example. Furthermore, the particular features, structures, routines, steps or characteristics may be combined in any suitable manner in one or more examples of the technology. The headings provided herein are for convenience only and are not intended to limit or interpret the scope or meaning of the claimed technology.

Certain embodiments of the technology described below may take the form of computer-executable instructions, including routines executed by a programmable computer or controller. Those skilled in the relevant art will appreciate that the technology can be practiced on computer or controller systems other than those shown and described below. The technology can be embodied in a special-purpose computer, controller, or data processor that is specifically programmed, configured or constructed to perform one or more of the computer-executable instructions described below. Accordingly, the terms "computer" and "controller" as generally used herein refer to any data processor and can include internet appliances, hand-held devices, multi-processor systems, programmable consumer electronics, network computers, mini-computers, and the like. The technology can also be practiced in distributed environments where tasks or modules are performed by remote processing devices that are linked through a communications network. Aspects of the technology described below may be stored or distributed on computer-readable media, including magnetic or optically readable or removable computer discs as well as media distributed electronically over networks. In particular embodiments, data structures and transmissions of data particular to aspects of the technology are also encompassed within the scope of the present technology. The present technology encompasses both methods of programming computer-readable media to perform particular steps, as well as executing the steps.

In some embodiments, a method of forming a polymer film on a polymer surface in which a hydroxylation solution is used is disclosed. The method can include a step of hydroxylating a polymer surface in a hydroxylation solution. The hydroxylation solution can include, for example, potassium persulfate, ammonium persulfate, or lithium hydroxide. The method can also include a step of halogenating the polymer surface. The method can also include a step of performing surface initiated atom-transfer radical-polymerization on the polymer surface. Performing surface initiated atom-transfer radical polymerization forms a polymer film on the polymer surface.

In some embodiments, a method of forming a polymer film on a polymer surface in which a halogenation solution is used is disclosed. The method can include a step of providing a polymer surface having hydroxyl groups bonded to the polymer surface. The method can further include a step of halogenating the polymer surface in a halogenation solution. In some embodiments, the halogenation solution includes hydrobromic acid, hydrochloric acid, phosphorous tribromide, phosphorous trichloride, hydroiodic acid, thionyl chloride, thionyl bromide, or combinations thereof. The method can also include a step of performing surface initiated atom-transfer radical-polymerization on the polymer surface. The surface initiated atom-transfer radical-polymerization step can result in the formation of a polymer film on the polymer surface.

In some embodiments, a method of forming a polymer layer on a bundle of hollow polymer fibers is disclosed. The method can include a step of providing a bundle of hollow polymer fibers. The method can further include a step of performing surface initiated atom-transfer radical-polymerization on the bundle of hollow polymer fibers. The surface initiated atom-transfer radical-polymerization step can result in the formation of a polymer film on the polymer surface.

Polymer Layer Formation Method

With reference to FIG. 1, a method of forming a polymer layer on polymer surface generally includes a step 110 of hydroxylating the polymer surface, a step 120 of halogenating the surface, and a step 130 of performing surface initiated atom-transfer radical-polymerization on the polymer surface to thereby form a polymer layer on the polymer surface.

In step 110, a polymer surface is provided and subjected to a hydroxylation process in order to add a plurality of hydroxyl groups to the polymer surface. Addition of the hydroxyl groups is generally aimed at providing a mechanism for bonding a halogen atom to the polymer surface.

The polymer surface upon which the polymer layer is formed can generally be a surface of any hydrocarbon-containing polymer material. In some embodiments, the polymer surface is selected from a range of materials known to be suitable for separation processes, such as in the sweetening of natural gas. Exemplary polymer materials suitable for use in step 110 include, but are not limited to, polymethyl pentene, polypropylene, cellulose acetate, polyimide, polyvinylidene fluoride (PVDF), and derivatives thereof. The polymer surface provided in step 110 can be a selectively permeable material or a material that is not selectively permeable.

In alternate embodiments, the surface upon which the polymer layer is formed can be a non-polymer material. For example, the surface can be the surface of a ceramic, metal, organic, or plastic material. These materials may be selectively permeable or may not be selectively permeable.

The polymer surface can be part of a variety of different forms. In some embodiments, the polymer surface is a surface of a polymer fiber. When polymer fibers are used, the methods described herein can be carried out on isolated polymer fibers or bundles of polymer fibers (including bundles of fibers that are potted together). When bundles of polymer fibers are used, the polymer fibers are generally aligned in parallel and arranged (or cut) to have coplanar terminal ends. The polymer fibers used in the methods described herein can also be hollow. When hollow fibers are used, the surface upon which the ATRP step is performed can be an interior and/or an exterior surface. In other embodiments, the polymer surface is the surface of a flat sheet, such as a spiral wound sheet.

The dimensions of the material providing the surface upon with ATRP is carried out are generally not limited. When polymer fibers are used, the length and diameter of the individual fibers are generally not limited. Similarly, when bundles of fibers are used, there is generally no limit to the number of fibers in a bundle, the overall length of the bundle or the overall diameter of the bundle. When spiral wound sheets are used, the length, width, and thickness of the sheets are generally not limited.

The material providing the surface upon which the ATRP step is performed is can be a porous or non-porous material. In some embodiments, the material has selectivities relative to certain compounds. The specific porosity and selectivities of the material is generally not limited. In some embodiments, the porosity of the material is generally within the range of from less than 1% to 90%. The size of the individual pores in the material can be in the range of 300 nm or smaller. The porosity of the material is generally consistent throughout the material.

In some embodiments, the polymer surface can be subjected to a cleaning step prior to performing step 110. The cleaning step is generally aimed at removing residual oil or other debris from the surface of the material. Any cleaning steps capable of removing unwanted material from the surface of the material can be used. In some embodiments, the polymer surface is immersed in or rinsed with a solution capable of removing unwanted material from the surface of the polymer material. In some embodiments, the solution includes acetone, methanol, organic solvents, or any combinations thereof. When the polymer surface is immersed in the cleaning solution, the cleaning process can include sequential baths in order to improve the amount of material removed. When the polymer surface is rinsed with the cleaning solution, the rinsing can be continuous and for any period of time to remove the unwanted material. The cleaning step can also be carried out in a variety of apparatus, including in an soxhlet extraction apparatus. The cleaning steps described above can be performed on any form of the polymer surface, including on isolated polymer fibers, on bundled polymer fibers, and on potted bundles of polymer fibers.

Figure 2A:
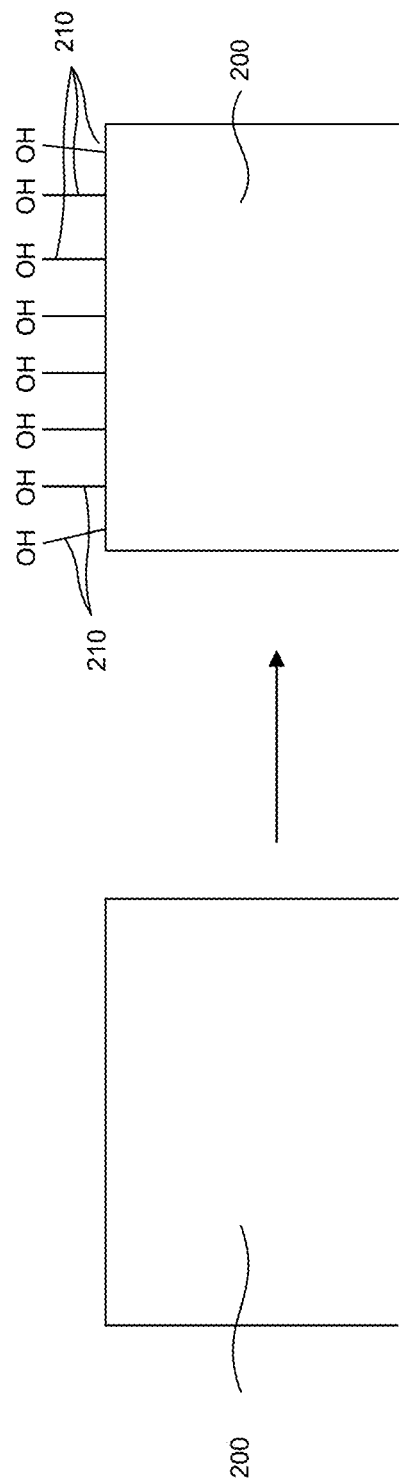
FIG. 2A is a schematic view of a hydroxylation process carried out on a polymer surface according to various embodiments described herein.

In step 110, the polymer surface is hydroxylated in order to add one or more hydroxyl groups to the surface of the material. Hydroxylation as used herein refers to the addition of one or more —OH groups to the polymer surface via covalent bonding between the polymer membrane material and the hydroxyl group. FIG. 2A illustrates the hydroxylation step, with a plurality of —OH groups 210 bonded to the surface of the material 200. The hydroxyl group 210 can bond to the polymer surface 200 via any suitable atom of the material. In some embodiments, the hydroxylation step removes a hydrogen atom from the polymer surface to provide a bonding cite between the polymer surface and the oxygen atom of the hydroxyl group. As discussed further below, the hydroxyl groups bonded to the polymer surface provide a mechanism for subsequently bonding a halogen atom to the polymer surface.

Any suitable method of hydroxylating the polymer surface material can be used. In some embodiments, the polymer surface is subjected to a hydroxylation solution which results in the addition of the —OH groups to the polymer surface. The hydroxylation solution can include any of a variety of suitable solutions. In some embodiments, the hydroxylation solution is a solution that includes potassium persulfate, ammonium persulfate, or lithium hydroxide, or combinations thereof. In some embodiments, the solution is an aqueous solution and therefor includes water.

In one embodiment wherein potassium persulfate or ammonium persulfate is used to perform hydroxylation, the hydroxylation step 110 is carried out by first preparing a bath of deoxygenated water which is continuously heated at 80° C. or higher. The potassium persulfate and/or the ammonium persulfate is then added to the water without introducing oxygen. The potassium persulfate and/or the ammonium persulfate can also be added prior to heating the deoxygenated water (i.e., the potassium persulfate and/or ammonium persulfate is added to the deoxygenated water, followed by heating of the bath to 80° C. or higher). The polymer surface can then be immersed in a bath of the solution or, when the polymer surface is mounted in a module, the solution can be flowed through the module. Generally speaking, the polymer surface is then exposed to the solution for a period of time (e.g., 10 minutes or more), during which hydroxylation of the surface of the material occurs. After the desired period of time has passed, the polymer surface is removed from the solution and rinsed.

In embodiments where lithium hydroxide is used, the polymer surface is generally a fluorinated polymer material. A specific fluorinated polymer that can be hydroxylated using lithium hydroxide is PVDF.

Other suitable hydroxylation solutions includes, ceric ammonium nitrate, ozone gas, piranha solutions (e.g., Caro's acid, peroxymonosulfuric acid, etc.), Fenton type reagents (e.g., hydrogen peroxide, iron sulfate, etc.), and chromate solutions. These hydroxylation materials can be used to carry out the hydroxylation step 110 in a similar or identical fashion to the method described above. In one embodiment, hydroxylation is carried out using potassium persulfate with iron sulfate in a Fenton-type reaction.

Other suitable hydroxylation methods can be used. For example, hydroxylation can be carried out without the use of a solution. In one example, the polymer surface can be oxidized using plasma etching, exposure to arc, or by exposure to flame.

In some embodiments, the polymer surface can be obtained from a third party with the surface having already been hydroxylated. Similarly, the material used in the methods described herein can naturally have hydroxyl groups available on the surface of the material, in which case the hydroxylation step 110 need not be carried out.

Figure 2B:
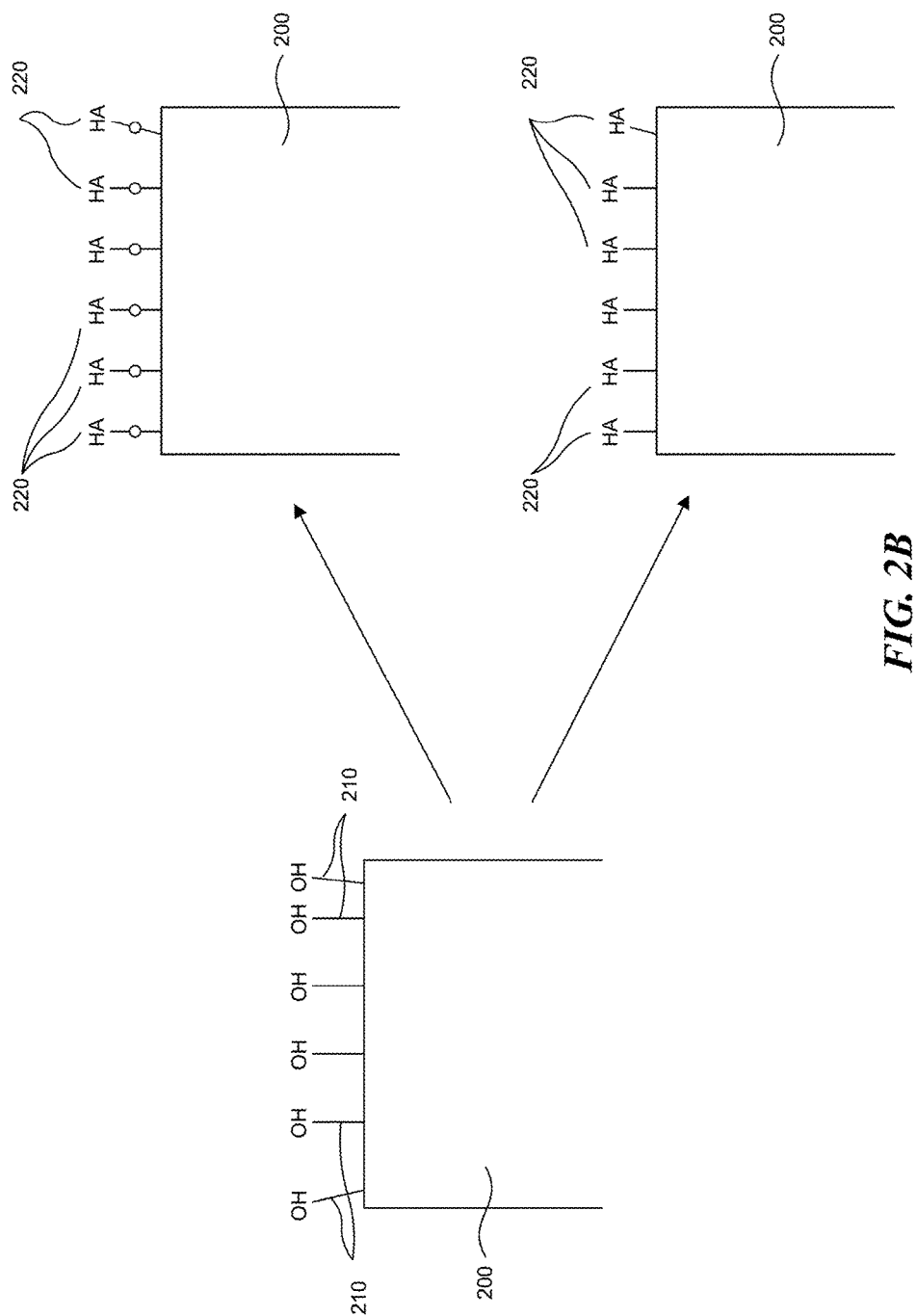
FIG. 2B is a schematic view of a halogenation process carried out on a surface according to various embodiments described herein.

Once the hydroxylation step 110 has taken place, a halogenation step 120 can be performed. The halogenation step 120 is generally aimed at bonding a halogen atom to the polymer surface. This can be accomplished either by bonding the halogen atom with the oxygen atom of the hydroxyl group or by replacing the hydroxyl group with the halogen atom (i.e., providing direct bonding between the halogen atom and the polymer surface). Halogenation as used herein refers to the addition of one or more halogen atoms to the polymer surface via covalent bonding between the hydroxyl group and the halogen atom or between the halogen atom and a carbon atom of the polymer surface (i.e., by completing removing the hydroxyl group). FIG. 2B illustrates the halogenation step, with a plurality of halogen atoms (HA) 220 bonded to the polymer surface 200 via the hydroxyl group 210 or a plurality of halogen atoms 220 bonding directly to the polymer surface 200 by replacing the hydroxyl group. In some embodiments, the halogenation step generally involves the attachment of a molecule having a radically transferable group (i.e., a halogen) to the hydroxyl group. Bonding the radically transferable group (e.g., the halogen atom) to the polymer surface sets the stage for the subsequent performance of ATRP on the polymer surface as discussed in greater detail below.

Any suitable method of halogenating the polymer surface material can be used. In some embodiments, the polymer surface is subjected to a halogenation solution which results in the addition of the halogen atoms to the polymer surface. The halogenation solution can include any of a variety of suitable solutions. In some embodiments, the halogenation solution includes hydrobromic acid, hydrochloric acid, phosphorous tribromide, phosphorous trichloride, hydroiodic acid, thionyl chloride, thionyl bromide, or combinations thereof. In some embodiments, the halogenation solution can further include water.

In some embodiments, the halogenation step 120 is carried out by first preparing a solution including hydrobromic acid, hydrochloric acid, phosphorous tribromide, phosphorous trichloride, hydroiodic acid, thionyl chloride, or thionyl bromide. The solution can optionally include water. The polymer surface can then be immersed in the solution or, when the polymer surface is mounted in a module, the solution can be flowed through the module. Generally speaking, the polymer surface is then exposed to the solution for a period of time during which halogenation of the surface of the polymer material occurs. After the desired period of time has passed, the polymer surface is removed from the solution and rinsed.

Other suitable halogenation solutions include acyl halides containing a radical transferable group (e.g., bromoisobutyryl bromide). These halogenation materials can be used to carry out the halogenation step 120 in a similar or identical fashion to the method described in the preceding paragraph.

Halogenation can also be performed using other suitable methods for adding halogen atoms to a polymer surface. In some embodiments, the halogenation step can take place without the use of halogenation solutions.

After the halogenation step is performed, a step 130 of performing surface initiated atom-transfer radical-polymerization (ATRP) to form a polymer layer on the polymer surface is carried out. ATRP is a known technique for conducting living polymerization in which one monomer is added at a time to a growing polymer. In the method described herein, the growing polymer is a polymer layer being formed on the surface of the polymer material. Because of the slow, controlled growth, ATRP is well suited for applications where tight control of monomer addition is desired. In the method described herein, the slow, controlled growth allows for tight control of layer thickness.

Figure 2C:
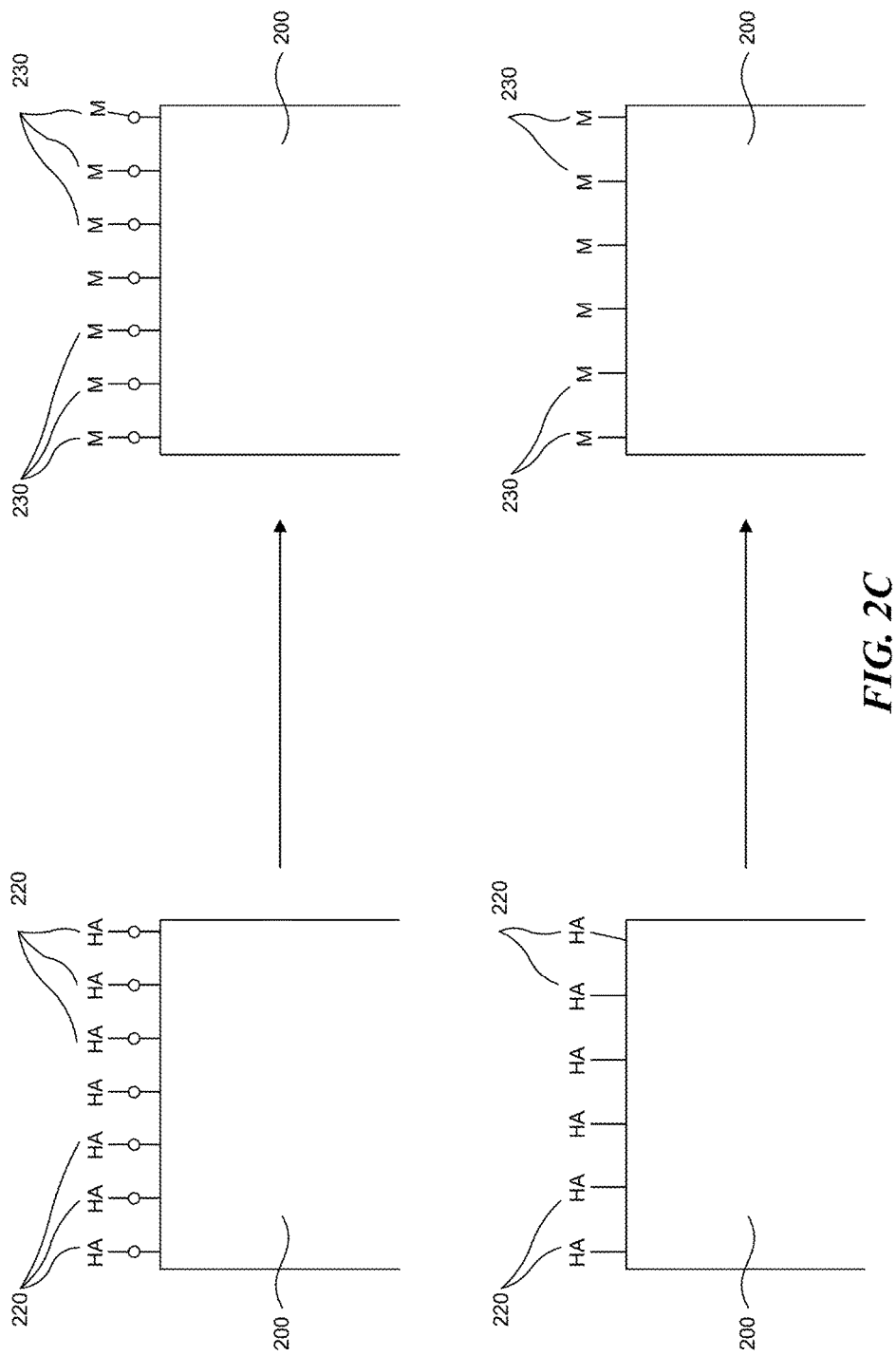
FIG. 2C is a schematic view of an ATRP process carried out on a polymer surface according to various embodiments described herein.

The ATRP step 130 generally involves exposing the polymer surface to an ATRP solution including various components necessary for conducting surface initiated ATRP. One component of the ATRP solution is a transition metal element complexed with an organic ligand. The transition metal element contained in an organic ligand initiates the ATRP by process by removing the halogen added in the halogenation step 120 to thereby produce a chain extending from the surface of the polymer material and which includes a radical at the terminal end. This radical is then attacked by a monomer molecule provided in the ATRP solution to thereby grow the chain by one unit. The growing chain bonded to the polymer surface is the basis for a layer formed on the polymer surface that continues to grow so long as a radical continues to exist on the growing chain. The radical continues to attack additional monomer units in the ATRP solution to thereby grow the polymer layer. FIG. 2C illustrates the ATRP process, wherein the halogen atom 220 (and optionally the remains of the hydroxyl group) has been removed and monomer units (M) 230 are added to the chain to begin formation of a polymer layer on the polymer surface 200.

Accordingly, step 130 generally involves exposing the polymer surface to an ATRP solution and allowing ATRP to take place such that a polymer layer is formed on the polymer surface. Exposing the polymer surface to an ATRP solution can entail immersing the polymer surface in an ATRP solution, or in the case of the polymer surface being mounted in a module, flowing the ATRP solution through the module or filling the module with the ATRP solution.

Generally speaking, the ATRP solution includes five main components: a solvent, a radically polymerizable monomer, a transition metal compound, a ligand, and a redox conjugate of the transition metal compound. The specific reagents chosen, the reagent concentrations, and the solvent can all be manipulated to allow for precise control of the polymerization and, consequently, the thickness of the polymer layer formed on the polymer surface. Time in the ATRP solution can also be used to control layer thickness.

The solvent component of the ATRP solution can include any of a variety of solvents suitable for use in ATRP processes. In some embodiments, the solvent is toluene, 1,4-dioxane, xylene, anisole, dimethyl formamide, dimethyl sulfoxide, water, tetrahydrofuran, methanol, acetonitrile, chloroform, and combinations thereof. In some embodiments, the solvent used is deoxygenated. In some embodiments, the solvent must include at least water.

The radically polymerizable monomer component of the ATRP solution can include a variety of monomer types suitable for use in ATRP processes. In some embodiments, the radically polymerixable monomer is styrenes, methacrylates, methacrylamides, and acrylonitriles, derivatives thereof, and combinations thereof. Specific examples include, but are not limited to, polyethylene glycol methacrylate and styrene species attached to chains of fluorocarbons.

The transition metal compound component of the ATRP solution can include, but is not limited to copper, ruthenium, iron, osmium, molybdenum, titanium, chromium, manganese, cobalt, rhodium, nickel, palladium, germanium, tin, bismuth and tellurium.

The ligand component of the ATRP solution is generally related to the transition metal compound, as the two components generally form a transition metal compound bonded to the ligand so that during the ATRP process, the transition metal compound can work to remove the halogen atom and join it to the transition metal compound-ligand complex. In some embodiments, the ligand is 2-2' bipyridine, tris(2-aminoethyl)amine, 4,4'-Di-5-nonyl-2,2'-bipyridine, 4,4',4"-tris(5-nonyl)-2,2':6',2"-terpyridine, 1,1,4,7,10,10-Hexamethyltriethylenetetramine, N, N-bis(2-pyridylmethyl) octadecylamine, N,N,N',N'-tetra[(2-pyridyl)methyl] ethylenediamine, tris[(2-pyridyl)methyl]amine, tris(2-bis(3-(2-ethylhexoxy)-3-oxopropyl)aminoethyl)amine, Tris(2-bis (3-dodecoxy-3-oxopropyl)aminoethyl)amine, N,N,N',N", N"-pentamethyldiethylenetriamine, or diethylenetriamine.

The redox conjugate of the transition metal compound is also generally selected based on the transition metal compound provided in the ATRP solution. The redox conjugate is provided so that at least some of the initially formed radicals in the ATRP process can be deactivated. In other words, the redox conjugate is provided so that halogen atoms can be transferred back to the polymer and terminate a portion of the active radicals that would otherwise be the cites for further monomer addition.

Once the ATRP solution is prepared, the polymer surface is exposed to the solution in order to form a polymer layer on the exposed surface via surface initiated ATRP. As noted above, the polymer surface can be immersed in a bath of the ATRP solution or the polymer surface can be mounted in module through which the ATRP solution is flowed or which is filled with the ATRP solution. Generally speaking any area upon which polymer layer is to be formed should be exposed to the ATRP solution. The amount of time the polymer surface is exposed to the ATRP solution can impact the thickness of the layer formed, and can also be adjusted based on the ratio of the components in the solution.

In some embodiments, ATRP reagents need to be regenerated in order to maintain the ATRP process. The regeneration of ATRP reagents can be carried out using any suitable method. In some embodiments, ATRP reagents are regenerated by simply adding more of the desired reagent to the ATRP solution being used in step 130. In other embodiments, electrodes can be incorporated into the method to regenerate some of the reagents. Other methods entail the use of ARGET ATRP or AGET ATRP. In these reaction configurations, the transition metal is regenerated from the higher oxidation state (where it inhibits the propagation of free radicals) to the lower oxidation state (where it acts as an activator for radical polymerization). This regeneration is accomplished through the addition of reducing agents to the solution. Alternatively, this regeneration may be accomplished through the addition of agents producing free radicals.

Termination of the ATRP step 130 can generally be carried out by removing the polymer surface from the ATRP solution. In some embodiments, a cleaning step is carried out after the polymer surface is removed from the ATRP solution in order to remove any residual reagents from the surface of the material. Cleaning of the polymer surface having a polymer layer formed thereon can be performed by, for example, rinsing the material with pure water, acetone, methanol, or any suitable solvent (organic or otherwise) that is compatible with the material and capable of dissolving the desired residue.

The polymer layer formed on the polymer surface is generally a non-porous polymer layer. As used herein, non-porous generally refers to a negligible porosity, such as in the range of less than 1 nm. In some embodiments, the non-porous polymer layer still provides a desired selectivity so that certain components may pass through the non-porous layer. In some embodiments, the selectivity favors a similar selectivity to the material upon which the non-porous polymer layer is formed so that the composite structure can be used beneficially for separation processing. For example, the underlying material and the non-porous polymer layer may both have selectivities that favor the passage of $CO_2/CH_4$ through the material so that the composite structure can be used in natural gas sweetening.

As noted above, the thickness of the non-porous polymer layer can be tightly controlled by varying a variety of factors. In some embodiments, the thickness of the non-porous polymer layer is in the range of from 75 to 200 nm. Extremely thin layers can also be produced, such as less than 75 nm or less than 5 nm. The non-porous polymer layer formed on the polymer surface is also generally formed in a continuous and uniform fashion as a result of the ATRP process.

In some embodiments, the formation of the non-porous polymer layer on the porous polymer material results in decreasing the size of the pores of the polymer material, and specifically the pores proximate the surface of the polymer material on which the polymer layer is formed. The pore size is reduced by virtue of the polymer branches of the polymer layer extending over the pores in the polymer material. In other words, the gap between pore walls in the polymer material is decreased because of polymer chains that form on the surface of the polymer material and extend over the gap between pore walls.

In some embodiments, the atom-transfer radical-polymerization solution can include monomer units that are capable of crosslinking with similar monomer units present in adjacent polymer chains. These monomer units, when incorporated into the individual polymer chains growing from the polymer membrane surface during ATRP, can link together with similar monomer units to thereby create links between adjacent polymer chains. This crosslinking activity can increase the strength of the polymer layer formed on the polymer surface. The crosslinking can also change the permeability of the layer and make the layer better suited for specific applications. The crosslinking monomer units included in the ATRP solution can generally include any monomer units capable of crosslinking. Exemplary crosslinking monomer units include poly(ethylene glycol) methacrylate amine.

In some embodiments, monomers with multiple groups capable of radical polymerization may be used to achieve the effects of cross linking. Exemplary monomer units with multiple radically polymerizable functional groups include poly(ethylene glycol) dimethacrylate, ethoxylated trimethylolpropane triacrylate, 2,2-bis(prop-2-enoyloxymethyl)butyl prop-2-enoate, and ethoxylated bisphenol A dimethacrylate, dipentaerythritol pentaacrylate.

In some embodiments, various steps can be taken prior to exposing the polymer surface to any of the solutions described herein to remove, for example, bubbles from the polymer surface and thereby ensure complete surface exposure. In some embodiments, the step includes sonicating the ATRP solution after immersing the polymer surface in the solution.

Membrane Modules

As noted above, various steps of the method described above can be performed by immersing the polymer surface in sequential baths. Various steps of the method can also be performed by using a closed module into which the polymer surface is mounted. In some embodiments, a combination of both baths and modules is used. For example, step 110 can be performed by immersing the material in a bath, while steps 120 and 130 are performed in a module. In another example, steps 110 and 120 can be performed by immersing the material in sequential baths, while performing step 130 with the material mounted in a module. In general, the mounting of the polymer surface in a module entails the use of bundles of hollow polymer fibers, though the modules discussed below can also be adapted for treating other forms of polymer material.

Figure 3:
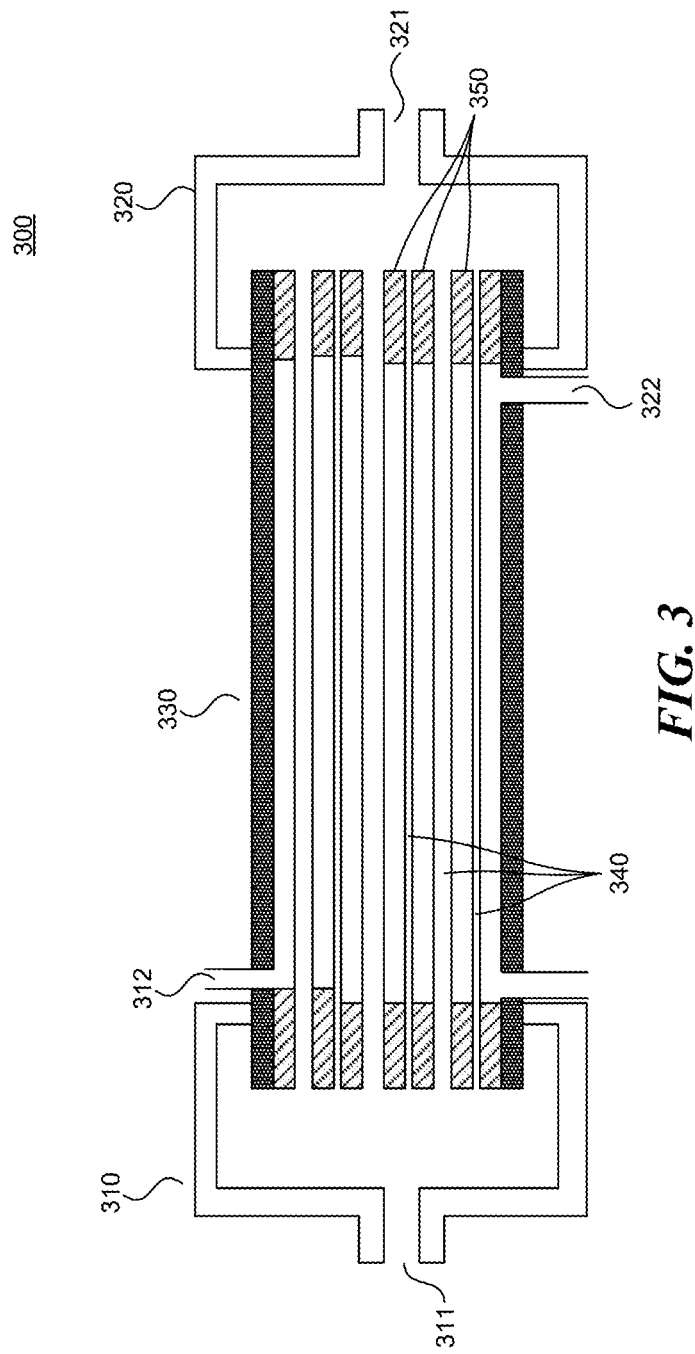
FIG. 3 is a cross sectional view of a module suitable for use various embodiments of methods described herein.
Figure 4:
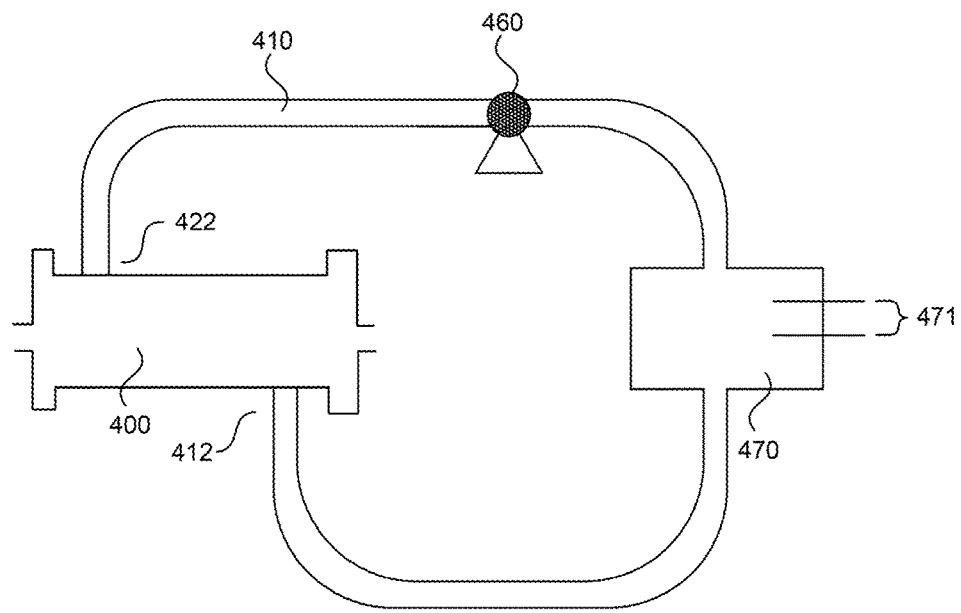
FIG. 4 is a schematic view of a module suitable for use in various embodiments of methods described herein.
Figure 5:
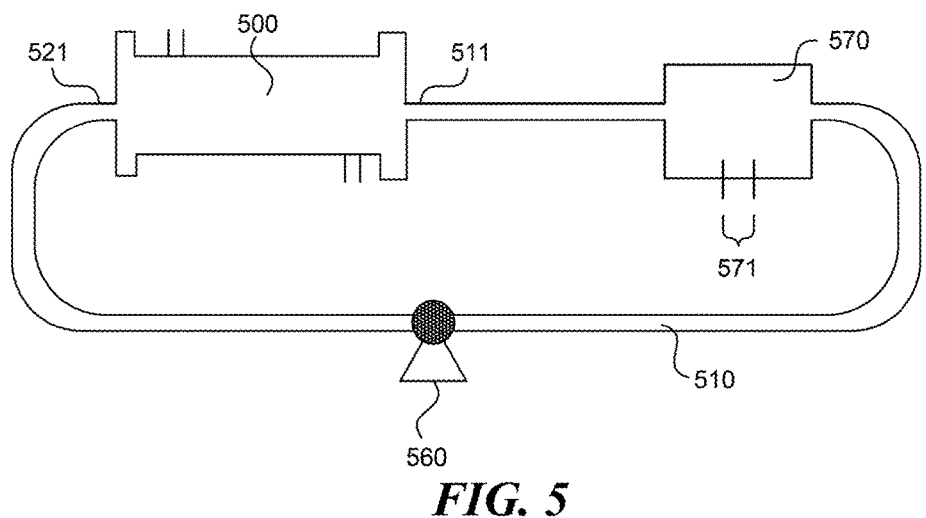
FIG. 5 is a schematic view of a module suitable for use in various embodiments of methods described herein.

With reference to FIGS. 3-5, various modules suitable for use with the methods described herein are shown. The modules generally take the form of shell and tube-type vessels, wherein a first liquid can flow through a shell side of the reactor without flowing in the tube side of the reactor and a second liquid can flow through a tube side of the reactor without flowing in the shell side of the reactor. These configurations can allow for selective formation of the polymer layer on the polymer surface, e.g., on only the exterior surfaces or only on the interior surfaces (in the case of hollow polymer fibers being mounted in the module).

With reference now to FIG. 3, the module 300 can include a first end 310, a second end 320, and a central region 330 located between the first end 310 and the second end 320. A bundle of hollow polymer fibers 340 can be mounted in the central region 330. The bundle of hollow polymer fibers 340 can also be potted with potting material 350 at each end. The potting material 350 ensures that liquid entering at either the first end 310 or second end 320 can only flow through the interior of the hollow polymer fibers 340 and not between adjacent hollow polymer fibers 340 (i.e., the potting prevents the fluid from contacting the exterior surface of the hollow polymer fibers). The potting of the bundle of polymer fibers 340 can be accomplished by sealing the end of the bundle of the hollow polymer fibers 340 with a castable polymer material 350 such that the castable polymer 350 blocks both the interior of the hollow polymer fibers 340 and the space between adjacent hollow polymer fibers 340. The castable polymer 350 generally travels further up into the bundle 340 between adjacent fibers than within the hollows of the fibers such that a slice can be made cross-sectionally through the bundle 340 at a point where the ends of the fibers are not blocked by castable polymer 350 but castable polymer 350 is still present between adjacent fibers.

The module 300 further includes a tube side inlet port 311, a tube side outlet port 321, a shell side inlet port 312, and a shell side outlet port 322. The tube side inlet port 311 and the tube side outlet port 321 are in fluid communication with only the interiors of the hollow fibers in the potted bundle 340 mounted in the module such that fluid entering the module 300 via the tube side inlet port 311 can only travel through the interior of the hollow polymer fibers. The castable polymer material 350 generally blocks the fluid entering from the tube side inlet 311 from travelling between adjacent hollow polymer fibers. The shell side inlet 312 and the shell side outlet 322 are in fluid communication with only the exterior of the hollow fibers in the potted bundle 330 mounted in the module 300 such that fluid entering the module 300 via the shell side inlet port 312 can only travel around the exterior of the hollow polymer fibers. In order to achieve this shell side fluid isolation, the shell side inlet port 312 and shell side outlet port 322 are generally located at the distal ends of the central region 330 and inside of the casting material 360 as shown in FIG. 3.

When a polymer layer is to be formed on the exterior of the hollow polymer fibers, the various solutions can be flowed through the shell side of the module 300. As noted above, any steps 110, 120 and 130 can be performed this way. For example, if hydroxylation is to be carried out on the exterior surfaces of the hollow polymer fibers, the hydroxylation solution is flowed through the shell side of the module 300. Halogenation solution and ATRP solution can also be flowed in this manner.

When a polymer layer is to be formed on the interior of the hollow polymer fibers, the various solutions can be flowed through the tube side of the module 300. As with the exterior coating, one or more of steps 110, 120, and 130 can be performed in this manner by flowing various solutions through the tubes side of the module 300.

In some embodiments, additional steps can be taken in order to protect the potting material 350. The various solutions used can be corrosive to the potting material and generally degrade the potting material over time. Accordingly, in some embodiments a protective layer is added to the inner and/or outer axial surfaces of the potting material. In this manner, fluid flowing through the, e.g., tube side of the module 300 will not directly contact the potting material adjacent the ends of the hollow. The protective layer can include, for example, fluorocarbon polymers, silicone polymers, and polyurethanes.

In some embodiments, modules similar or identical to those described above are used as part of a circuit that recirculates the solution to continue carrying out the hydroxylation, halogenation, or ATRP reaction. With reference to FIG. 4, the circuit can include shell side tubing 410 that fluidly connects the shell side outlet port 422 of the vessel 400 to the shell side inlet port 412. Located between the inlet port 412 and the outlet port 422 may be a pump 460 to help circulate the material through the tubing 410. The tubing can also include a reservoir 470 that includes electrodes 471 used to regenerate various reagents, including the transition metal ions necessary to carry out the ATRP step.

The electrodes can also be used to regenerate reagents used in the hydroxylation step and/or the halogenation step. The reservoir 470 may be used to add, exchange, or replace reagents during the ATRP reaction.

FIG. 5 is similar to FIG. 4, but includes tube side tubing 510. The tube side tubing 510 fluidly connects the tube side outlet port 521 of the vessel 500 to the tube side inlet port 511. Located between the inlet port 511 and the outlet port 521 may be a pump 560 to help circulate the material through the tubing 510. The tubing 510 can also include a reservoir 570 that includes electrodes 571 used to regenerate various reagents, including the transition metal ions necessary to carry out the ATRP step The electrodes 571 can also be used to regenerate reagents used in the hydroxylation step and/or the halogenation step.

Figure 6:
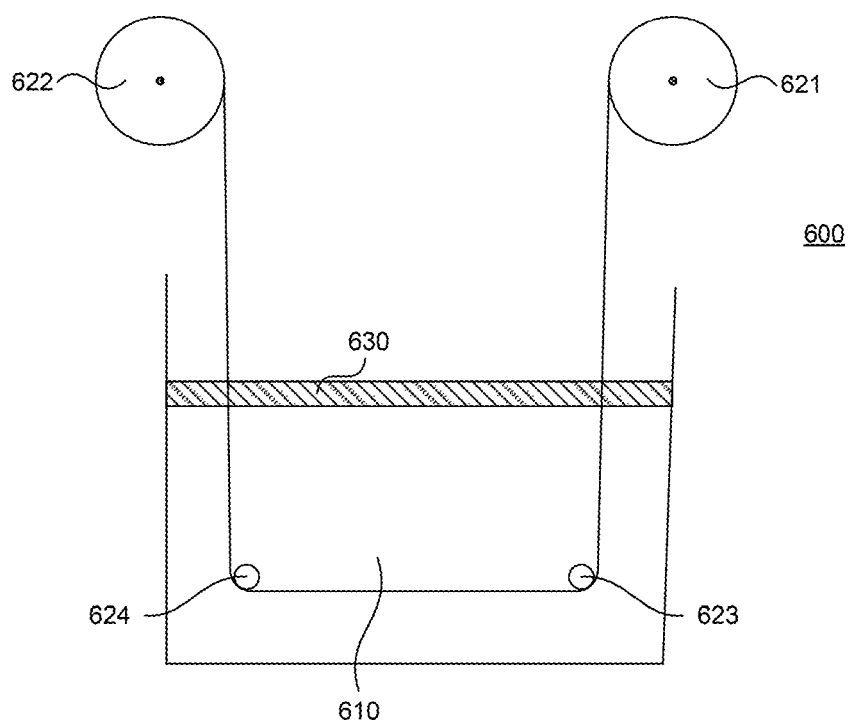
FIG. 6 is a schematic view of a reel to reel system suitable for use with various embodiments of the methods described herein.

In some embodiments, a reel to reel system can be used to carry out the methods described herein in place of (or in conjunction with) the modules as described above. FIG. 6 provides an illustration of a reel to reel system 600 which provides a mechanism for passing the polymer surface through the various solutions. As shown, the system 600 generally includes a bath vessel 610 which may be filled with any of the solutions described above (e.g., hydroxylation solution, halogenation solution, ATRP solution). The system 600 further includes reels 620, 621. The first reel 621 includes wound material which is drawn off the wheel 621, passed through the bath vessel 610 containing the solution, and collected on the second reel 622. The system may include any number of additional pulleys 623, 624, to guide the material through the bath vessel 610. The system 600 may also include a barrier layer 630 on top of the bath vessel 610 in order to create a closed vessel that prevents oxygen from contacting the solution in the bath vessel 610.

The configuration shown in FIG. 6 can be part of two or more sequential systems, with each system containing a different solution. In such an embodiment, the polymer material can begin on reel 621 and, instead of being collected on a reel 622, can be passed on to a second system containing a different solution. The collection reel 622 can be positioned at the end of the last system. The system shown in FIG. 6 can also be used in conjunction with a module. For example, a first reel to reel system can be used to carry out the hydroxylation step, followed by a second reel to reel system used to carry out the halogenation step. After the halogenation step, the material can be mounted in a module used for carrying out the ATRP step.

The reel to reel system shown in FIG. 6 can be used with a variety different forms of material. For example, the material can be a continuous piece of hollow polymer fiber thread that is subsequently cut into discrete lengths. The reel to reel system is also adapted to process sheets of polymer material.

Applications

Natural Gas—Streams containing mixtures of various gas components may be separated into two streams, each containing a higher percentage of one of more of the components in comparison to the inlet stream using membrane units fabricated in accordance with the methods described herein. Membrane modules manufactured using the methods described herein may be used in this capacity to remove carbon dioxide, hydrogen sulfide, and/or other components from natural gas streams. This is accomplished due to the higher permeability of the membrane to one gas component in comparison to another component. Use of the methods described herein to form membranes with thin polymer layers allows for previously unavailable polymeric materials to be used in the formation of membranes for gas separation.

Additionally, modules fabricated using the methods described herein may be linked in series to more efficiently separate a particular gas stream. These modules may be emplaced in series to increase the capacity of a membrane system. The modules may also be emplaced in arrangements in parallel and cascade to separate a multicomponent gas stream.

Water Purification—Modules incorporating membranes fabricated using the methods described herein may be used to remove contaminants and desired species from water. The polymer coating formed using the methods described herein can be designed to be permeable to water and impermeable or relatively less permeable to the contaminants in the water.

Blood oxygenation—Non-porous or relatively non-porous hollow fiber membranes formed using the methods described herein can be applicable for blood oxygenation. The non-porous nature or relatively non-porous nature of the hollow fiber may prevent blood plasma leakage while allowing sufficient blood gas exchange.

Lithium Ion battery separators—Porous separators are used in the manufacture of lithium ion batteries. These separators prevent certain ions and molecular species from crossing while allowing others to move uninhibited. The use of the methods described herein to from these separators can allow for the control of the pore size. This technique can be used to form desired surface coatings to enhance the performance of these devices. The ability to form such a coating after the porous separator is emplaced into the battery cell can improve manufacturability and prevent defects.

Protein Purification—Porous membranes have been used to purify biological molecules, particularly proteins. The ability to emplace a wide range of coatings on the surface of membranes using methods described herein may increase the use of this technique. Methods described herein may also be potentially used to the control the pore size of these membranes, allowing for efficient size exclusion separation.

Membrane Bioreactor—The ability to deposit tailored coatings on the surface of membranes may be beneficial in the establishment of desired biological conditions. Pore size control using methods described herein may be beneficial in preventing certain biological species or solid particles from crossing the membrane.

Membrane Distillation—The ability to apply a very thin coating of desired polymer using methods described herein may be beneficial for the production of membrane distillation devices, as the surface tension of the liquid and walls of the membrane pores is critical to the function of these devices.

Dialysis—Blood contact with membranes during dialysis and oxygenation procedures is unavoidable. The ability to deposit a tailored coating on the surface of these membranes that prevents or inhibits coagulation and blood activation may significantly increase the performance of these devices. Such coating deposition may be carried out using methods as described herein.

WORKING EXAMPLES

Example 1

A composite hollow fiber membrane module was prepared by grouping 800 polypropylene hollow fiber membranes with outer diameter of 300 micrometers into a bundle. This bundle was then placed into a flask with two necks. The flask was then filled with one liter of deionized water. This water was then bubbled for a period of 20 minutes with argon to remove oxygen dissolved in the water. This flask was attached to a condenser and a rubber stopper was attached to the open neck. Through this rubber stopper, argon was continually bubbled. The flask was then heated to 100° C. under reflux. At this point, 100 milligrams of potassium persulfate was added to the water and the solution was permitted to react for 10 minutes. After this point, the fiber bundle was removed, cleaned with deionized water, and then dried. The fiber bundle was then immersed into concentrated hydrobromic acid for 24 hours. Afterward, the bundle was washed with deionized water and dried.

A solution containing 140 ml of deionized water and 60 ml of poly(ethylene glycol) methacrylate with approximately 520 repeating units of ethylene glycol was bubbled with argon to remove oxygen. 600 mg of copper (I) chloride, 160 mg of copper (II) chloride and 1.12 grams of 2-2' bipyridine were then added to the solution. This ATRP solution was then sonicated for a period of 10 minutes. The bundle of polypropylene hollow fibers were then immersed into this solution and allowed to react for 24 hours.

The bundle was then removed from the solution and washed thoroughly with water and dried. It was then sealed into a stainless steel membrane module using castable polyurethane. After hardening, the polyurethane resin was severed with a sharp razor to reveal the open bores of the hollow fibers.

Example 2

A composite hollow fiber membrane module was prepared by grouping 800 polypropylene hollow fiber membranes with outer diameter of 300 micrometers into a bundle. This bundle was then potted into a stainless steel hollow module using a castable polyurethane resin.

200 ml of oxygen free, boiling deionized water were then mixed with 20 mg of potassium persulfate and quickly poured into the hollow fiber membrane module so that the liquid contacted the outer surface of the membrane. This reaction was permitted for a period of 10 minutes. Afterward, the persulfate solution was removed and the module was rinsed with a large amount of deionized water and dried.

200 ml of concentrated hydrobromic acid was poured into the membrane module in such a manner as to contact all exterior surfaces of the hollow fiber membrane. This solution was allowed to react for 24 hours. Afterward, it was removed and the module, rinsed with deionized water, and dried.

A solution containing 140 ml of deionized water and 60 ml of poly(ethylene glycol) methacrylate with approximately 520 repeating units of ethylene glycol was bubbled with argon to remove oxygen. 600 mg of copper (I) chloride, 160 mg of copper (II) chloride and 1.12 grams of 2-2' bipyridine were then added to the solution. This ATRP solution was then sonicated for a period of 10 minutes. The solution was then placed in the membrane module and permitted to react for 24 hours. Afterward, the solution was removed, the module rinsed with water, and dried.

Example 3

A composite hollow fiber membrane module was prepared by grouping 800 polypropylene hollow fiber membranes with outer diameter of 300 micrometers into a bundle. This bundle was then placed into a flask with two necks. The flask was then filled with one liter of deionized water. This water was then bubbled for a period of 20 minutes with argon to remove oxygen dissolved in the water. This flask was attached to a condenser and a rubber stopper was attached to the open neck. Through this rubber stopper, argon was continually bubbled. The flask was then heated to 100° C. under reflux. At this point 100 milligrams of potassium persulfate was added to the water and the solution was permitted to react for 10 minutes. After this point, the fiber bundle was removed, cleaned with deionized water, and then dried.

The fiber bundle was then placed into a dry, two necked flask equipped with an air stop and a rubber stopper. The fibers were immersed in 230 ml of tetrahydrofuran and 6 ml of triethyl amine. Argon was then supplied through a needle, bubbling the solution. This solution was then cooled to 0° C.

In a separate flask, 5 ml of bromoisobutyryl bromide and 20 ml of tetrahydrofuran were combined and sealed. The contents of this second flask were then transferred to the first flask anaerobically over the course of one hour. The solution containing the fiber was then permitted to rise to room temperature and react for 12 hours. Afterward, the fiber bundle was removed, washed with water, and dried.

The bundle was then removed from the solution and washed thoroughly with water and dried. It was then sealed into a stainless steel membrane module using castable polyurethane. After hardening, the polyurethane resin was severed with a sharp razor to reveal the open bores of the hollow fibers A solution containing 140 ml of deionized water and 60 ml of poly(ethylene glycol) methacrylate with approximately 520 repeating units of ethylene glycol was bubbled with argon to remove oxygen. 600 mg of copper (I) chloride, 160 mg of copper (II) chloride and 1.12 grams of 2-2' bipyridine were then added to the solution. This ATRP solution was then sonicated for a period of 10 minutes. This solution was then added to the membrane module in such a fashion as to contact the outer surface of the fibers. This reaction was permitted for 24 hours. Afterward, the module was rinsed with water and dried.

Example 4

A composite hollow fiber membrane module was prepared by grouping 800 polymethyl pentene hollow fiber membranes with outer diameter of 200 micrometers into a bundle. This bundle was then placed into a flask with two necks. The flask was then filled with one liter of deionized water. This water was then bubbled for a period of 20 minutes with argon to remove dissolved in the water. This flask was attached to a condenser and a rubber stopper was attached to the open neck. Through this rubber stopper, argon was continually bubbled. The flask was then heated to 100° C. under reflux. At this point, 100 milligrams of potassium persulfate was added to the water and the solution was permitted to react for 10 minutes. After this point, the fiber bundle was removed, cleaned with deionized water, and then dried. The fiber bundle was then immersed into concentrated hydrobromic acid for 24 hours. Afterward, the bundle was washed with deionized water and dried.

A solution containing 140 ml of deionized water and 60 ml of poly(ethylene glycol) methacrylate with approximately 520 repeating units of ethylene glycol was bubbled with argon to remove oxygen. 600 mg of copper (I) chloride, 160 mg of copper (II) chloride and 1.12 grams of 2-2' bipyridine were then added to the solution. This ATRP solution was then sonicated for a period of 10 minutes. The bundle of polymethyl pentene hollow fibers were then immersed into this solution and allowed to react for 24 hours.

The bundle was then removed from the solution and washed thoroughly with water and dried. It was then sealed into a stainless steel membrane module using castable polyurethane. After hardening, the polyurethane resin was severed with a sharp razor to reveal the open bores of the hollow fibers.

Example 5

A hollow fiber membrane module was constructed. A bundle of 500 polyvinylidene difluoride hollow fiber membranes were immersed into a 500 ml solution of water containing 20 g of lithium hydroxide. This reaction was permitted to occur for 24 hours. Afterward, the fibers were removed, rinsed with deionized water, and dried.

The bundle of fibers was then immersed into concentrated hydrobromic acid for a period of 24 hours. Afterward they were washed with deionized water and dried.

This fiber bundle was then potted into a stainless steel membrane module. A solution containing 140 ml of deionized water and 60 ml of poly(ethylene glycol) dimethacrylate with approximately 800 repeating units of ethylene glycol was bubbled with argon to remove oxygen. 600 mg of copper (I) chloride, 160 mg of copper (II) chloride and 1.12 grams of 2-2' bipyridine were then added to the solution. This ATRP solution was then sonicated for a period of 10 minutes. This solution was then placed into contact with the membrane module and permitted to react for 24 hours. Afterward, the module was rinsed with water and dried. The hardened resin was then severed with a sharp razor to expose the tubes of the membrane.

Example 6

A method similar to Example 2 was used to form bore coatings on the interior surfaces of polypropylene hollow fiber membrane previously potted in a membrane module. The persulfate solution was pump through the bore of the hollow fiber membrane continuously for ten minutes. Afterward, water was flushed through the bore and the module was dried. Concentrated hydrobromic acid was then circulated through the bores of the fibers for 24 hours. Water was then flushed through the bores of the fibers. The ATRP solution was then circulated through the bores of the fibers for 24 hours. Afterward the tube side of the membranes were flushed with water and the module was dried.

From the foregoing, it will be appreciated that specific embodiments of the invention have been described herein for purposes of illustration, but that various modifications may be made without deviating from the scope of the invention. Accordingly, the invention is not limited except as by the appended claims.

Certain aspects of the technology described in the context of particular embodiments may be combined or eliminated in other embodiments. Further while advantages associated with certain embodiments of the technology have been described in the context of those embodiments, other embodiments may also exhibit such advantages, and not all embodiments need necessarily exhibit such advantages to fall within the scope of the present disclosure. Accordingly, the present disclosure and associated technology can encompass other embodiments not expressly shown or described herein.

We claim:

1. A method of forming a polymer film on a polymer fiber, the method comprising the steps of:

(a) cleaning the polymer fiber by successively immersing the polymer fiber in one or more solvents;
(b) hydroxylating the polymer fiber in a hydroxylation solution comprising potassium persulfate;
(c) halogenating the polymer fiber; and
(d) performing surface initiated atom-transfer radical-polymerization on the polymer fiber, wherein the surface initiated atom-transfer radical polymerization forms a polymer film on the polymer fiber.

2. The method of claim 1, wherein the hydroxylation solution further comprises water.

3. The method of claim 1, wherein the polymer fiber comprises a bundle of polymer fibers.

4. The method of claim 3, further comprising the step of potting the bundle of polymer fibers in a module after performing step (a) and prior to performing step (b).

5. The method of claim 4, wherein the bundle of polymer fibers comprises a bundle of hollow polymer fibers and the bundle of hollow polymer fibers is potted in the module such that only the exterior surface of the hollow polymer fibers is exposed to the hydroxylation solution.

6. The method of claim 4, wherein the bundle of polymer fibers comprises a bundle of hollow polymer fibers and the bundle of hollow polymer fibers is potted in the module such that only the interior surface of the hollow polymer fibers is exposed to the hydroxylation solution.

7. The method of claim 3, wherein:
step (b) is performed by immersing the bundle of polymer fibers in a bath of the hydroxylation solution.

8. The method of claim 3, wherein step (a) is performed prior to potting the bundle of polymer fibers in a module and steps (c) and (d) are performed after potting the bundle of polymer fibers in a module.

9. The method of claim 3, wherein steps (b) and (c) are performed prior to potting the bundle of polymer fibers in a module and step (d) is performed after potting the bundle of polymer fibers in a module.

10. The method of claim 1, wherein the one or more solvents comprises acetone, methanol, organic solvents, or combinations thereof.

11. A method of forming a polymer layer on a bundle of hollow polymer fibers, the method comprising:
providing a bundle of hollow polymer fibers;
cleaning the bundle of hollow polymer fibers by successively immersing the bundle of hollow polymer fibers in one or more solvents;
potting the bundle of hollow polymer fibers in a module;
halogenating the bundle of hollow polymer fibers with a halogenation solution; and
performing surface initiated atom-transfer radical-polymerization on the bundle of hollow polymer fibers, wherein the surface initiated atom-transfer radical polymerization forms a polymer film on the hollow polymer fibers;
wherein the halogenation solution comprises hydrobromic acid, hydrochloric acid, phosphorous tribromide, phosphorous trichloride, hydroiodic acid, thionyl chloride, thionyl bromide, or combinations thereof.

12. The method of claim 11, wherein the method further comprises the step of hydroxylating the bundle of polymer fibers prior to performing surface initiated atom-transfer radical-polymerization.

13. The method of claim 12, wherein hydroxylating is carried out using a hydroxylation solution.

14. The method of claim 13, wherein the hydroxylation solution comprises potassium persulfate, ammonium persulfate, lithium hydroxide, or combinations thereof.

15. The method of claim 11, wherein the one or more solvents comprises acetone, methanol, organic solvents, or combinations thereof.

\* \* \* \* \*